| United States Patent [19]
Evani et al.

[11] 4,025,484
[45] May 24, 1977

[54] POLYMERIC STABILIZED DISPERSIONS

[75] Inventors: Syamalarao Evani; Dennis McKeever; Russell J. Raymond, all of Midland, Mich.

[73] Assignee: The Dow Chemical Company, Midland, Mich.

[22] Filed: Sept. 7, 1976

[21] Appl. No.: 721,020

Related U.S. Application Data

[63] Continuation-in-part of Ser. No. 591,202, June 27, 1975, abandoned.

[52] U.S. Cl. .................. 260/33.6 UA; 260/32.8 R; 260/33.4 R; 260/34.2; 526/317
[51] Int. Cl.² ..................... C08K 5/01; C08K 5/05; C08K 5/07
[58] Field of Search ................ 260/32.8 R, 33.4 R, 260/33.6 UA, 34.2; 106/309; 526/317

[56] References Cited

UNITED STATES PATENTS 3,794,608  2/1974  Evani et al. ...................... 260/874

*Primary Examiner*—Melvyn I. Marquis
*Assistant Examiner*—H. H. Fletcher
*Attorney, Agent, or Firm*—Albin R. Lindstrom

[57] ABSTRACT

Dispersions of finely divided particulate solids in an organic liquid in which the solids are insoluble are stabilized by the addition of a polymeric dispersant having a degree of polymerization of about 10 to 100. An example of the polymeric dispersant is an interpolymer of styrene, maleic anhydride and a vinyl benzyl ether of ethoxylated nonyl phenol.

6 Claims, No Drawings

POLYMERIC STABILIZED DISPERSIONS

REFERENCE TO COPENDING APPLICATION

This application is a continuation-in-part of copending application U.S. Ser. No. 591,202 filed June 27, 1975, and now abandoned.

BACKGROUND OF THE INVENTION

Various polymeric materials have been prepared as dispersants for nonaqueous dispersions, e.g. U.S. Pat. Nos. 3,249,454; 3,484,261; 3,514,500 and 3,580,880. The dispersants of this invention are distinct from the above in that they have a pendant surfactant group attached to the polymer backbone by a vinyl ether linkage. The latter two patents disclose dispersants which have a backbone of one polarity and a pendant group of a different polarity.

SUMMARY OF THE INVENTION

Three different monomers are polymerized to form the polymeric dispersants of this invention. The first monomer is monoalkenyl aromatic monomer. The second monomer is a vinyl acid or anhydride. The third monomer is a vinyl benzyl ether having the formula

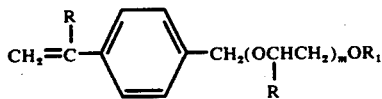

where R is hydrogen or methyl, $m$ is about 10 to 100 and $R_1$ is a hydrophobic group of about 10 to 22 carbons.

Polymers having a degree of polymerization of about 10 to 100 are employed. The proportions of monomers may vary from about 0.5 to 0.9 mole of the first monomer and about 0.1 to 0.5 mole of the third monomer per mole of the second monomer. Mixtures of each type of monomer may be used.

Using the above polymeric dispersant, stable dispersions of finely divided particulate solids in an organic liquid in which the solids are insoluble may be readily made by conventional methods.

DESCRIPTION

This invention relates to dispersions of insoluble finely divided particulate solids in an organic liquid which contains certain polymeric materials as dispersing agents. The particular dispersants are polymeric materials having a degree of polymerization of about 10 to 100 and having at least one pendant group per molecule which is the residue of an ethoxylated nonionic surfactant by removal of hydrogen from the hydroxyl group. This pendant group is linked to the polymer backbone by a benzyl ether linkage.

The dispersions may be prepared to contain very high amounts of dispersed solids and have greatly reduced viscosities due to the presence of the particular dispersants employed. Other benefits and advantages will be apparent in the many uses for these dispersants.

Of particular advantage is that the polymeric dispersants are effective in a variety of organic liquids of varying polarity including highly nonpolar liquids such as aromatic and aliphatic hydrocarbons. Other solvents include alcohols, ketones, etc. The proportion of the first and third monomers to the second monomer can be easily varied within the recited proportions for any one liquid medium. Among other useful systems in which the dispersants may be employed are liquid, thermosettable resin systems including those where the resin is dissolved in a copolymerizable monomer. The dual advantage of being able to increase the dispersed filler loading while maintaining fluid viscosities are of practical and economic importance. Typical resins are unsaturated polyester resins and terminally unsaturated vinyl ester resins.

Dispersions of finely divided insoluble particulate solids are extensively used in the preparation of paints and the like and in thermosettable resin systems as outlined above. In the latter case, the solids (fillers) impart desirable physical properties to the cured resin-filler mixture and the fillers decrease the overall cost. The utility of pigments in paints is well known. Dispersants have many other useful purposes such as emulsifier and stabilizers for emulsions and suspensions, grinding aids and the like.

The particulate solids may be present in amounts up to as high as 70 to 80 weight percent and even higher and still retain fluid viscosities in the resulting dispersion. Dispersions having a wide range of dispersed solids are contemplated by this invention. The dispersants are particularly effective with inorganic materials. Commonly used inorganic fillers, pigments, etc. include $CaCO_3$, $TiO_2$, $SiO_2$, kaolinite and other clays, $ZnO_2$, carbon black, color pigments, barium carbonate and the like. These materials are commercially available in a finely divided state for immediate use without any further size reduction. Organic pigments and other organic solids are commonly dispersed in various systems. Polymeric materials, preservatives and other biocidal materials, cosmetic materials, oily and greasy materials, etc. are typical of the various organic solids from which dispersions and emulsions are prepared.

In most instances only an amount of the dispersant sufficient to obtain a stable dispersion is employed. This amount will vary depending on the dispersed particles and organic liquid selected. Generally, the amount will be about 0.1 to 5 weight percent based on the weight of dispersed solids, preferably about 0.5 to 2 percent.

Important to the dispersions of this invention is the polymeric dispersant employed. The dispersants are polymers having at least one pendant surfactant group per molecule and a degree of polymerization (DP) of about 10 to 100, preferably about 10 to 50. The degree of polymerization is easily determined from the molecular weight as measured by standard methods, as, for example, by gel permeation chromatography, and calculating the DP. Three distinct types of monomers are polymerized to form the polymeric dispersant. The polymers may be prepared in substantially the same manner as the thickening agents disclosed in U.S. Pat. No. 3,794,608 except that the procedure is modified to produce polymers with a low degree of polymerization as opposed to the generally high molecular weight thickeners of U.S. Pat. No. 3,794,608. The polymerization procedure may be modified, for example, by employing chain growth regulating (short-stopping) agents such as mercaptans, etc. or by increasing the catalyst level and polymerization temperature. Other means of modifying the polymerization procedure to produce polymers with a low degree of polymeriation are known and their use will be apparent to the skilled worker.

The dispersant is prepared from a misture of three kinds of monomers. The first monomer is a monoalkenyl aromatic monomer such as styrene, α-methyl styrene, vinyl toluene, t-butyl styrene and the like. The second type of monomer is a vinyl acid or anhydride. Typical monomers include maleic anhydride, maleic acid, fumaric acid, alkyl half esters of maleic and furaric acid, alkyl half amides of maleic and fumaric acid, acrylic acid and methacrylic acid and the like.

Most important to the dispersant activity is the third monomer, a vinyl benzyl ether of a nonionic surfactant having the formula

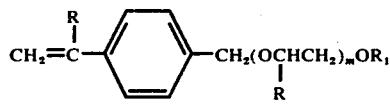

where R is hydrogen or methyl, $m$ is about 10 to 100 and $R_1$ is a hydrophobic group of about 10 to 22 carbons. $R_1$ is a hydrophobic group such as an alkyl, aralkyl or alkaryl group of 10 to about 22 carbons. Typically $R_1$ may be decyl, laruyl, myristyl, cetyl, stearyl, oleyl, linoleyl, 2-phenyl decyl, octyl phenyl, nonyl phenyl, dodecyl phenyl and the like.

In the above vinyl benzyl ether, $m$ is preferably about 20 to 40 and the oxyalkylene unit is preferably oxyethylene, ($OCH_2CH_2$). It should be pointed out the polyoxyalkylene chain may be a mixture of oxyethylene and oxypropylene units. If mixtures of any of the first, second or third type monomers are used, the proportions of each type should be within the defined range.

The third monomers are generally prepared by reacting vinyl benzyl chloride (or bromide) with a nonionic surfactant such as ethoxylated nonylphenol. Various hydrophobic groups such as alkyl phenols and fatty alcohols are readily condensed with ethylene oxide, propylene oxides or mixtures thereof to prepare such surfactants. Consequently, many of said surfactants are commercially available. Nonionic surfactants of the above type and their preparation are fully described in "Nonionic surfactants," vol. 1, edited by M. J. Schick, published by Marcel Decker, Inc., New York, 1967. The preparation of the vinyl benzyl monomers if disclosed in U.S. Pat. No. 3,794,608.

The polymeric dispersant is prepared by polymerizing a mixture of the first, second and third type monomers in the respective molar proportions of about 0.5/1/0.5 to 0.9/1/0.1. Stated differently, the monomer mixture comprises about 0.5 to 0.9 mole of the first monomer and about 0.1 to 0.5 mole of the third monomer per each mole of the second monomer. A preferred dispersant according to this invention is a copolymer of styrene/maleic anhydride/vinyl benzyl ether.

The following nonlimiting examples will further illustrate the invention. All parts and percentages are by weight unless otherwise specified.

EXAMPLE 1

A vinyl benzyl ether of an ethoxylated nonyl phenol (R=H and m=40) was prepared in a manner similar to Example 1 of U.S. Pat. No. 3,794,608. A polymeric dispersant was prepared by polymerizing 0.8 mole of styrene, 1 mole of maleic anhydride and 0.2 mole of the above vinyl benzyl ether monomer which will be abbreviated as VBE of nonyl phenol 40 EO. The polymer was an oily material at 80° C and on cooling to room temperature was a waxy, semi-solid. Infrared spectra indicate the anhydride was converted to the diacid form. The polymer has an inherent viscosity at a concentration of 0.05 weight percent in acetone at 25° C of 0.07 which is a degree of polymerization (DP) of about 10. The polymer was partially soluble in toluene but completely soluble in toluene containing a small amount of methyl alcohol. The polymer was also soluble in styrene but the solution was slightly turbid.

A solution of 2 gms of the above polymer in 8 gms of toluene and 2 gms of methyl alcohol was prepared. Dispersions of $CaCO_3$ (Atomite) in toluene were then prepared as follows:

| Dispersion No. | 1 | 2 | 3 | 4 |
|---|---|---|---|---|
| Toluene, gms. | 20 | 20 | 20 | 30 |
| Dispersant Soln, gms. | — | 1 | 1.5 | 2.5 |
| $CaCO_3$ gms. | 20 | 20 | 30 | 50 |
| Conc. of $CaCO_3$ | 50% | ~50% | ~60% | ~60% |
| % Dispersant on weight of $CaCO_3$ | — | 0.8% | 0.825% | 0.82% |
| Characteristics of dispersion | Thick Paste | Thin Slurry | Thin Slurry | Thin Slurry |

EXAMPLE 2

To 50 gms of styrene, 2.5 gms of the polymeric dispersant of Example 1 was added and stirred to dissolve the polymer. A small amount of undissolved material remained which was not removed. Incremental amounts of $CaCO_3$ were added with stirring and the viscosity measured after each increment was added. The results are tabulated below.

| $CaCO_3$ Added | Total $CaCO_3$ in Slurry | % $CaCO_3$ in Total Slurry | Brookfield Viscosity of Dispersion No. 5 Spindle 20 rpm |
|---|---|---|---|
| 100 gms. | 100 gms. | ~66.6% | 100 cps |
| 50 | 150 | 75 | 100 |
| 25 | 175 | 77.7 | 150 |
| 25 | 200 | 80 | 250 |
| 25 | 225 | 81.75 | 300 |
| 25 | 250 | 83.33 | 400 |
| 50 | 300 | 85.7 | dilatant slurry |

The very low viscosity of this dispersion up to 83 percent solids is quite surprising. At 83 percent solids the amount of dispersant used is only about 1 percent on the weight of $CaCO_3$. In contrast to the above, the styrene becomes a very thick, nearly dry paste when 100 gms of $CaCO_3$ was added to 50 gms of styrene without the dispersant.

EXAMPLE 3

The efficiency of the dispersant with a $CaCO_3$ dispersion in a resin/monomer solution is shown by this example. The resin employed (Resin A) was a terminally unsaturated vinyl ester resin prepared by reacting about 1 equivalent of methacrylic acid with 0.5 equivalent of a bisphenol A diepoxide having an epoxide equivalent weight (EEW) of about 186–192 and 0.5 equivalent of a higher molecular weight bisphenol A based polyepoxide (EEW of about 535). The methacrylic acid reacts with the epoxide group to form a methacrylate ester. Resin A was then diluted with 25 percent styrene.

An 80 percent dispersion of $CaCO_3$ in styrene was made from 20 gms of styrene, 80 gms of $CaCO_3$ using 1.5 gms of the dispersant of Example 1. In 50 gms of this dispersion, 25 gms of the Resin A/styrene mixture was added and mixed. The viscosity was measured on a Brookfield Viscometer, No. 5 spindle at 20 rpm. Additional 10 gm increments of $CaCO_3$ were added and the viscosity determined.

| $CaCO_3$ Added | Total Wt. $CaCO_3$ | % $CaCO_3$ | Viscosity cps |
|---|---|---|---|
| — | 40 gms | 53.3% | 1350 |
| 10 gms | 50 | 58.8 | 1950 |
| 10 | 60 | 63 | 3800 |

At 63 percent the amount of dispersant on the weight of $CaCO_3$ was 1.25 percent A similar experiment was made except that the polymeric dispersant was omitted. A mixture of 40 gms $CaCO_3$, 10 gms styrene and 25 gms of Resin A/styrene was made. After measuring the viscosity 10 gm increments of $CaCO_3$ were added.

| $CaCO_3$ Added | Total Wt. $CaCO_3$ | % $CaCO_3$ | Viscosity cps |
|---|---|---|---|
| — | 40 gms | 53.3% | 6200 |
| 10 gms | 50 | 58.8 | 15600 |
| 10 | 60 | 63 | Very thick paste |

EXAMPLE 4

In the manner of Example 3, 1 gm of the dispersant of Example 1 was mixed with 10 gms of styrene, 60 gms of $CaCO_3$ and then 25 gms of the Resin A/styrene mixture. As before, 10 gm incremental amounts of $CaCO_3$ were added and the viscosity measured.

| $CaCO_3$ Added | Total Wt. $CaCO_3$ | % $CaCO_3$ | Viscosity cps |
|---|---|---|---|
| — | 60 gms | 63.1% | 2000 |
| 10 gms | 70 | 66.6 | 3400 |
| 10 | 80 | 69.5 | 7800 |

At 69.5 percent the amount of dispersant on the weight of $CaCO_3$ was 1.25 percent.

Vinyl ester resins as employed in the examples are generally prepared by reacting about equivalent amounts of an unsaturated monocarboxylic acid with a polyepoxide having more than one epoxide group per molecule. The preparation of such resins is described in U.S. Pats. Nos. 3,179,623; 3,301,743; 3,256,226; 3,377,406; 3,367,992 and 3,564,074, all of which are incorporated herein by reference for the purpose of defining various resins contemplated by the designation of vinyl ester resins.

Unsaturated polyesters are well known resins generally prepared by condensing one or more diols with one or more unsaturated dicarboxylic acids. The acids may be used in their anhydride form. Saturated acids or anhydrides may partially replace the unsaturated acid or anhydride.

What is claimed is:

1. A dispersion of finely divided particulate solids in an organic liquid in which the solids are insoluble containing a sufficient amount of a polymeric dispersant to stabilize the dispersion, said dispersant having an average degree of polymerization of about 10 to 100 and comprising in interpolymerized form
    a. a monoalkenyl aromatic monomer,
    b. a vinyl acid or anhydride, and
    c. a vinyl benzyl monomer having the formula

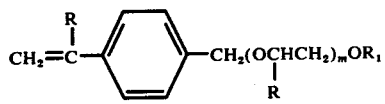

where R may be hydrogen or methyl, $m$ is about 10 to 100 and $R_1$ is a hydrophobic group of about 10 to 22 carbons; and wherein the molar amounts of monomer (a) and monomer (c) per mole of monomer (b) range from about 0.5 to 0.9 and 0.1 to 0.5, respectively.

2. A dispersion according to claim 1 wherein the particulate solids are inorganic materials.

3. A dispersion according to claim 2 wherein the organic liquid is a solution of a thermosettable resin in a vinyl monomer.

4. A dispersion according to claim 2 where the dispersant is a copolymer of styrene, maleic acid or anhydride and a vinyl benzyl ether where $R_1$ is an alkyl phenyl 5. A dispersion according to claim 4 wherein R is hydrogen and $m$ is 20 to 40.

6. A dispersion according to claim 2 wherein the resin is a terminally unsaturated vinyl ester resin.

* * * * *

UNITED STATES PATENT AND TRADEMARK OFFICE
CERTIFICATE OF CORRECTION

PATENT NO. : 4,025,484
DATED : May 24, 1977
INVENTOR(S) : Syamalarao Evani, Dennis McKeever & Russell J. Raymond It is certified that error appears in the above-identified patent and that said Letters Patent are hereby corrected as shown below:

Column 2, line 18, delete "emulsifier" and insert --emulsifiers--.

Column 2, line 66, delete "polymeriation" and insert --polymerization--.

Column 3, line 1, delete "misture" and insert --mixture--.

Column 3, line 8, delete "raric" and insert --maric--.

Column 3, line 23, delete "laruyl" and insert --lauryl--.

Column 3, line 42, delete "surfactants" and insert --Surfactant--.

Column 3, line 44, delete "if" and insert --is--.

Column 4, line 3, delete "has" and insert --had--.

Column 5, line 15, insert --.-- at the end of the line.

UNITED STATES PATENT AND TRADEMARK OFFICE
CERTIFICATE OF CORRECTION

PATENT NO. : 4,025,484                        Page 2 of 2 pages

DATED : May 24, 1977

INVENTOR(S) : Syamalarao Evani, Dennis McKeever & Russell J. Raymond

It is certified that error appears in the above-identified patent and that said Letters Patent are hereby corrected as shown below:

Column 6, line 22, insert --ether-- after the word "benzyl".

Column 6, line 44, insert --group.-- after the word "phenyl".

Signed and Sealed this

Twenty-second Day of November 1977

[SEAL]

Attest:

RUTH C. MASON          LUTRELLE F. PARKER
*Attesting Officer*      *Acting Commissioner of Patents and Trademarks*